United States Patent [19]

Ringlien et al.

[11] Patent Number: 4,967,070

[45] Date of Patent: Oct. 30, 1990

[54] INDENTIFICATION OF A MOLDED CONTAINER WITH ITS MOLD OF ORIGIN

[75] Inventors: James A. Ringlien, Maumee, Ohio; Dennis L. Brower, Sand Creek, Mich.

[73] Assignee: Owens-Brockway Glass Container Inc., Toledo, Ohio

[21] Appl. No.: 381,883

[22] Filed: Jul. 19, 1989

[51] Int. Cl.[5] .......... G01N 9/04; G06K 5/00

[52] U.S. Cl. .......... 250/223 B; 250/556

[58] Field of Search .......... 250/223 B, 223 R, 234, 250/235, 236, 566, 568, 556, 557; 356/240; 235/454, 470; 209/524, 588

[56] References Cited

U.S. PATENT DOCUMENTS

| | | | |
|---|---|---|---|
| 3,745,314 | 7/1973 | Mathias et al. | 250/223 B |
| 3,963,918 | 6/1976 | Jensen et al. | 250/223 B |
| 3,991,883 | 11/1976 | Hobler et al. | 250/223 B |
| 4,175,236 | 11/1979 | Juvinall | 250/566 |
| 4,201,338 | 5/1980 | Keller | 250/223 B |
| 4,230,219 | 10/1980 | Pezzin et al. | 198/481 |
| 4,230,266 | 10/1980 | Juvinall | 235/490 |
| 4,644,151 | 2/1987 | Juvinall | 250/223 B |

FOREIGN PATENT DOCUMENTS

| | | |
|---|---|---|
| 2033120 | 5/1980 | United Kingdom . |
| 2071892 | 9/1981 | United Kingdom . |

*Primary Examiner*—David C. Nelms
*Assistant Examiner*—Michael Messinger

[57] ABSTRACT

Apparatus for reading a mold-identifying code in the form of a plurality of surface irregularities extending in an arcuate array around the container heal concentrically with the container axis. A starwheel conveyor sequentially moves a series of containers in an arcuate path about a conveyor axis to and through a reading station. A belt positioned adjacent to the conveyor periphery engages containers at the reading station and is driven so as to rotate the containers about their central axes. A light source is imaged at the conveyor axis through container heel. A scanning mirror is positioned to receive an image of the light source transmitted through the container heel and to reflect such image onto a camera. The scanning mirror is driven as a function of conveyor rotation so as to follow a container traveling through the reading station and reflect onto the camera an image of that circumferential portion of the illuminated container heel closest to the conveyor axis.

10 Claims, 2 Drawing Sheets

INDENTIFICATION OF A MOLDED CONTAINER WITH ITS MOLD OF ORIGIN

The present invention is directed to inspection of molded containers, and more particularly to an apparatus and method for identifying a molded container such as a glass bottle or jar with its associated mold of origin.

BACKGROUND AND OBJECTS OF THE INVENTION

Commercial variations or checks in molded containers such as glass bottles and jars are often related to anomalies in the associated molds of origin For this reason, it is desirable in an automated operation having a plurality of molds to possess the ability of identifying a specific molded container with its mold of origin A mold associated with anomalous containers may then be shut down for repair while the remaining molds continue operation Alternatively, containers from the anomalous mold may be automatically sorted as they proceed along the production line.

Mold identification is generally accomplished by molding a mold-identifying code into each container during the forming process. This code may be read by a suitable scanner for identifying the container with its mold of origin U.S. Pat. No. 4,644,151 discloses a system in which each container has molded therein a plurality of indicia in the form of surface irregularities (bumps or protrusions) extending in a arcuate array around the container heel perpendicularly of the container axis. A source of semi-diffused light energy is directed onto the container heel as the container is rotated about its central axis, with the light energy source having an intensity gradient at predetermined orientation with respect to the container axis. A camera, which includes a linear array of light elements optically coplanar with the container axis, is positioned to receive an image of the light source reflected by the container heel, such that individual irregularities in the code array alter the intensity of light reflected by the heel onto the camera. An information processor receives electrical signals from the camera associated with intensity of light at the various camera elements, and the code is read as a function of alterations in light intensity caused by reflections from the bump side edges.

Although the apparatus disclosed in the noted U.S. Patent represents a significant advance in the art theretofore developed, further improvements remain desirable. For example, use of reflected light energy in the preferred embodiment of the disclosed apparatus makes alignment and setup of apparatus components somewhat critical, and necessitates resetup for containers of differing sizes and/or having bumps or protrusions of differing geometries. Further, in the preferred embodiment of the disclosed apparatus, the containers are held stationary and rotated about their central axes to sweep the heel codes across the light source, thereby necessitating interruption of continuous motion of the containers through the production facility. It is a general object of the present invention to provide an apparatus and method for reading a mold-identifying code on a container of the described character that are adapted to operate as the container is fed in a continuous uninterrupted motion through the apparatus code-reading station, and/or that employ an image of the light source that is transmitted through rather then reflected by the container, thereby rendering apparatus setup less sensitive to size and shape of the containers and/or the code-identifying irregularities.

SUMMARY OF THE INVENTION

Apparatus for reading a code on a molded container indicative of mold of origin, in which the code comprises a series of irregularities extending in an arcuate array concentric with the container axis along a selected portion of the container, includes a conveyor for sequentially presenting a series of containers in a continuous uninterrupted motion to and through a reading station. A source directs light energy onto the containers traveling through the reading station, and each container is rotated about its central axis during passage through the reading station so that the code array of each container sweeps the light source. An image of the illuminated portion of the container is projected onto a camera as the container is moved by the conveyor through the reading station, such that passage of the surface irregularities through the image alters light energy transmitted from the source to the camera. Codes of the individual containers are read as a function of such alterations in light energy.

In the preferred embodiment of the invention, a starwheel conveyor moves the containers through the reading station in an arcuate path centered on the conveyor axis. The light source is positioned on a side of the arcuate path opposite the conveyor axis, and is imaged at the conveyor axis through that portion of the container in which the code is positioned —i.e., the container heel. A scanning mirror is positioned to receive an image of the light source transmitted through the container, and reflects such image onto the camera. The scanning mirror is coupled to the conveyor to rotate with the conveyor and follow each container passing through the reading station, and to reflect onto the camera an image of that circumferential section of the container heel closest to the conveyor axis. Thus, containers are fed in a continuous uninterrupted motion to and through the reading station, and light energy transmitted through rather than reflected by the container is employed to read the container code.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
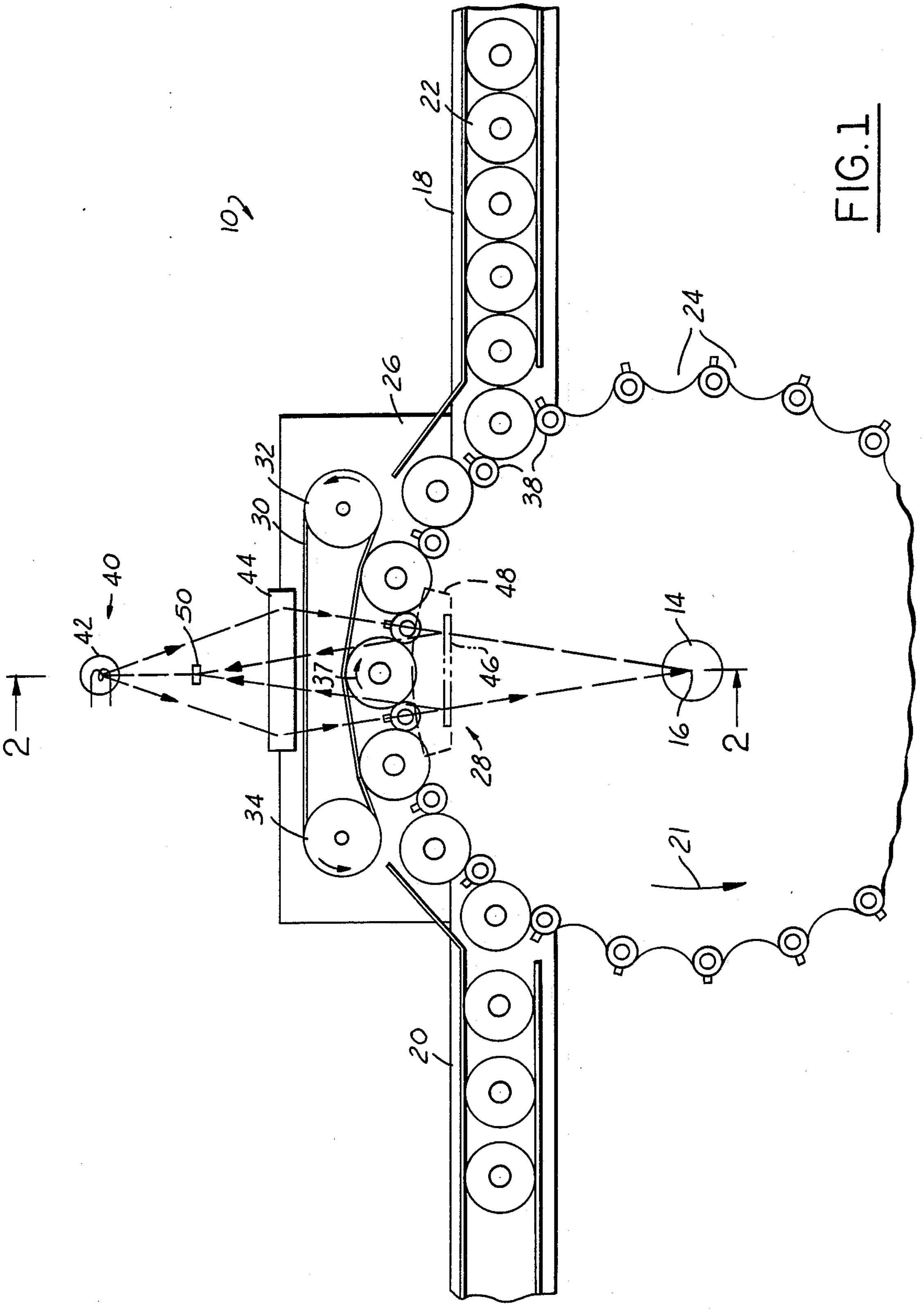
FIG. 1 is a top plan view of a container conveyor system that schematically illustrates code-reading apparatus in accordance with a presently preferred embodiment of the invention.

The drawings illustrate apparatus 10 in accordance with a presently preferred embodiment of the invention as including a starwheel conveyor 12 mounted on a shaft 14 to rotate about a vertical axis 16. Starwheel 12 is positioned between upstream and downstream sections 18, 20 of a belt conveyor or the like for feeding molded containers 22 to and from the periphery of starwheel 12. The force of containers 22 pushed into the circumferentially spaced pockets 24 of starwheel 12 rotates the starwheel in a continuous uninterrupted motion such that the containers are conveyed in an arcuate path in direction 21 along a slide plate 26 to and through an electrooptical code-reading station 28 prior to deposition on downstream belt conveyor section 20. Starwheel conveyors 12 of the type illustrated in the drawings are disclosed, for example, in U.S. Pat. Nos. 4,230,219 and 4,378,493.

A belt 30 is looped around a pair of pulleys 32, 34 that are carried by slide plate 26 at circumferentially spacedapart positions radially outwardly adjacent to starwheel 12. The central reach of belt 30 engages containers 22 conveyed by starwheel 12 through reading station 28 and hold the containers in the starwheel pockets. Pulley 32 is coupled to a motor 36 (FIG. 2) for driving belt 30 and thereby rotating containers 22 about their central axes in the direction 37 as the containers are conveyed through the reading station. Idler rollers 38 at the side edges of each pocket 24 on starwheel 12 engage containers 22 and permit free rotation of the containers under force of belt 30. One or both of the pulleys 32, 34 are spring-biased to maintain tension in belt 30.

Figure 2:
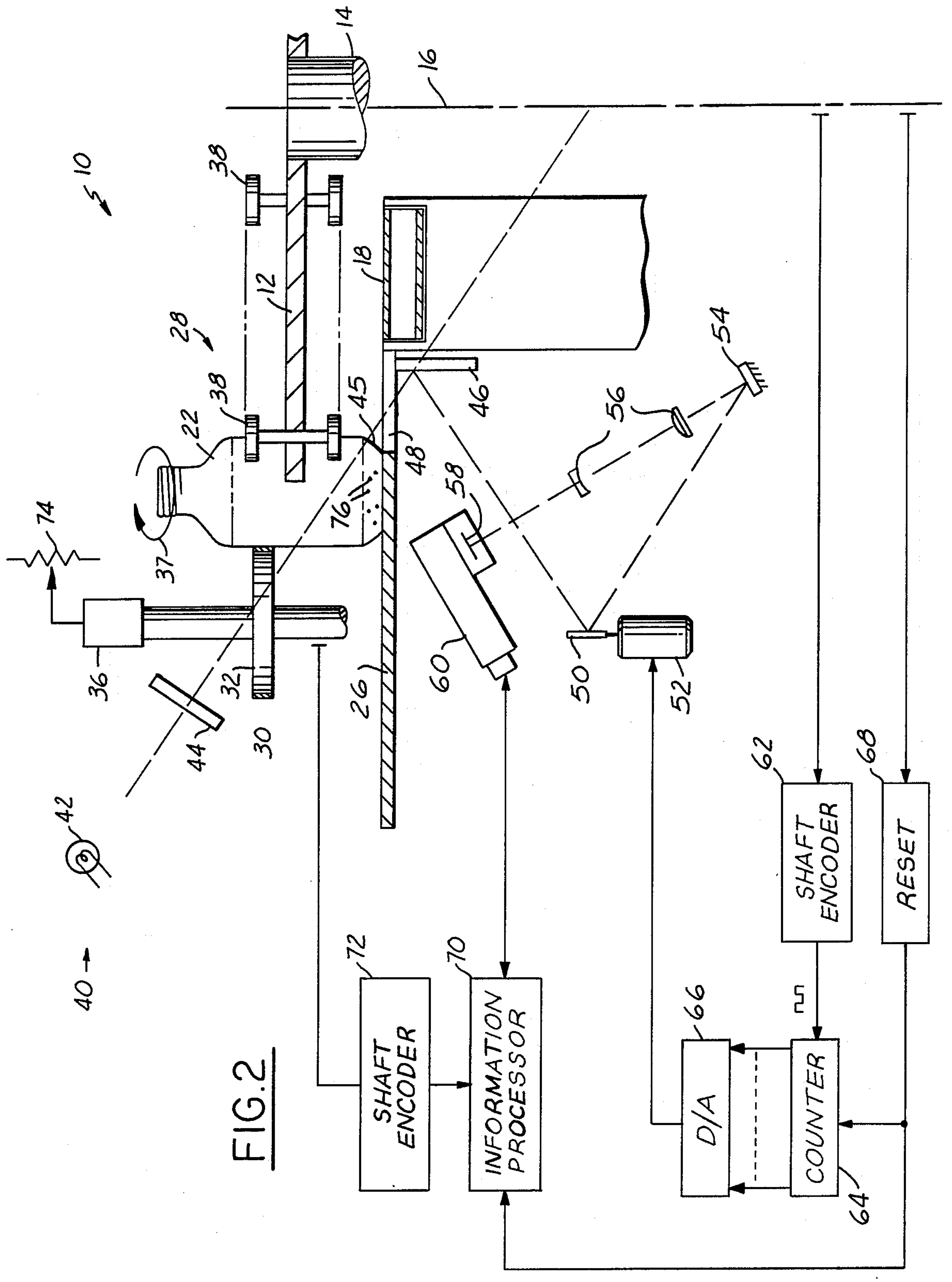
FIG. 2 is a partially schematic and partially sectioned view of the conveyor and reading apparatus in FIG. 1, being taken substantially along the line 2—2 in FIG. 1.

A light source 40 is positioned at reading station 28 radially outwardly of the periphery of starwheel 12 and upwardly of the sliding surface of plate 26. Light source 40 includes one or more lamps 42 and a fresnel lens 44 for directing diffused or semi-diffused light energy from lamp 42 through a container 22 at reading station 28, and for imaging lamp 42 at axis 16 of starwheel rotation. It will be observed in FIG. 1 that the width of the light beam from lamp 42 at the periphery of starwheel 12 is substantially equal to separation between an adjacent pair of rollers 38, which thus define the width of code-reading station 28. As best seen in FIG. 2, light from source 40 is directed through the sidewall of the container, and through that portion of the container heel 45 closest to axis 16. It will also be noted in FIG. 1 that the light energy from source 40 is directed substantially diametrically through each container 22 as the container is arcuately conveyed in direction 21 through the reading station. Thus, light travels substantially diametrically through that portion of the container heel closest to axis 16 during the entire motion of the container though the reading station.

A mirror 46 is positioned beneath slide plate 26 and receives light from source 40 through container 22 and through an opening 48 in the slide plate. Mirror 46 reflects or folds the image of the light source onto a scanning mirror 50 (FIGS. 1 and 2). Mirror 50, which is positioned at the virtual axis of starwheel rotation, is connected to a motor 52 to rotate about an axis parallel to axis 16. The image of light source 40 is reflected by mirror 50 onto a fixed mirror 54, and thence through lenses 56 onto the light sensitive array 58 of a camera 60. Array 58 preferably comprises a linear array of light sensitive elements. The longitudinal dimension of array 58 is coplanar with axis 16 and the axis of rotation of scanning mirror 50, and thus coplanar with the axis of rotation of containers 22.

A first shaft encoder 62 is coupled to starwheel shaft 14 so as to generate a series of encoder pulses as a function of starwheel rotation. The output of encoder 62 is fed to the count input of a digital counter 64, the parallel output of which is coupled to motor 52 through a d/a converter 66. Mirror 50 coupled to motor 52 thus rotates as a direct function of rotation of shaft 14. A reset circuit 68 is likewise responsive to rotation of starwheel shaft 14 for resetting counter 64 upon passage of each container 22 through station 28. Mirror 50 thus rotates as a direct function of starwheel rotation so as to follow each container in turn as the container is fed through the reading station, and to image onto array 58 of camera 60 that section of the container heel closest to axis 16. An information processor 70 receives electrical signals from camera 60 as a function of light energy incident on the elements of camera array 58. Processor 70 also receives the output of reset circuit 68 for distinguishing between adjacent containers 22. A second encoder 72 is coupled to pulley 32 and motor 36 for providing to processor 70 a pulsed signal indicative of pulley and belt speed. The speed of motor 36 is adjustable by a variable resistor 74 or the like.

In general, individual code elements or bumps 76 on container heel 45 (FIG. 2) are detected as a function of light energy transmitted through each element Following a complete container scan, consisting of at least one rotation plus the width of the array of code dots, and preferably two rotations, of each container 22 passing through station 28, intensity variations detected by the camera are correlated to locate the code array, identify individual code elements, and then identify the code represented by the element sets. Structure and operation of camera 60 and information processor 70 in this respect are disclosed in detail in U.S. Pat. No. 4,644,151, assigned to the assignee hereof and incorporated herein by reference.

In implementation in accordance with the present invention, smooth container walls and moderate undulations in the wall do not deflect light energy from source 40 sufficiently to cause a dark image at the camera. A code element, however, having much steeper sides, refracts the light sufficiently to miss the receiver optics and cause the element to look dark. The very center of the element does not deflect the light and looks bright, such that each code element effectively appears as a dark annulus on a light or gray field. In most cases, no readjustment or setup is necessary with changes in ware configuration. As long as the code elements remain in the illuminated field and reasonably in focus, the slope of the heel from one container configuration to another is not critical. This is because the differential refraction is not greatly affected by slope of the container material in the region of the code elements. In contrast, the reflection technique disclosed in the referenced U.S. Patent is very sensitive to slope of the container surface in the region of the code elements, and had to be readjusted for differing container configurations.

We claim:

1. Apparatus for reading a code on a molded container indicative of mold of origin, said code comprising a plurality of surface irregularities extending in an arcuate array around a selected portion of the container concentrically with the container axis, said apparatus comprising:

a conveyor for sequentially moving a series of containers in an arcuate path about a fixed conveyor axis in a continuous uninterrupted motion to and through a reading station, means for rotating each container about its axis as the containers pass in turn through the reading station, a light source that includes means for imaging said light source at said conveyor axis through the selected portion of a container at said reading station, said light source being positioned on a side of said path remote from said axis and directing light energy toward containers in said path at an acute angle to said axis, a camera, a scanning mirror optically positioned at said conveyor axis to receive at said acute angle an image of said light source transmitted through the selected portion of the container at said reading station and to reflect such image onto said camera, and means coupled to said conveyor to rotate said scanning mirror about an axis parallel to said conveyor axis in synchronism with motion of said conveyor so as to reflect onto said camera an image of that circumferential section of the container selected portion closest to said conveyor axis, and means coupled to said camera for reading codes of containers as a function of variations in light energy incident on said camera as the code irregularities on the selected portions of a container at said reading station sweep said image.

2. The apparatus set forth in claim 1 further comprising means positioned between said path and said conveyor axis for reflecting light energy from said source onto said scanning mirror, said scanning mirror being positioned at the virtual axis of said conveyor.

3. The apparatus set forth in claim 2 wherein said conveyor comprises a starwheel conveyor having a control shaft, and wherein said mirror-rotating means comprises a motor coupled to said mirror and means for energizing said motor as a function of rotation of said shaft.

4. The apparatus set forth in claim 3 wherein said motorenergizing means comprises a shaft encoder coupled to said shaft for generating pulses as a function of rotation of said shaft, a counter coupled to said encoder for receiving and counting said pulses, and means connecting said counter to said motor.

5. The apparatus set forth in claim 4 wherein said counter-connecting means comprises a d/a convertor.

6. The apparatus set forth in claim 5 further comprising means coupled to said conveyor for resetting said counter when a container has passed through said reading station, such that said mirror is automatically repositioned to receive and reflect an image of said selected portion of the next container.

7. The apparatus set forth in claim 3 further comprising means responsive to passage of each container in turn through said reading station automatically to reposition said scanning mirror to receive said image through the next container.

8. The apparatus set forth in claim 3 wherein said container-rotating means comprises a belt, means positioning said belt in a loop of which one reach engages containers passing through said reading station, and means for driving said belt so as to rotate the containers.

9. The apparatus set forth in claim 8 wherein said belt-driving means comprises means for setting belt drive speed so as to rotate the containers at least twice while passing through said reading station.

10. The apparatus set forth in claim 3 wherein said light source and imaging means are positioned such that light from said source is transmitted substantially diametrically through the container passing through said reading station.

* * * * *